(12) United States Patent
Valente et al.

(10) Patent No.: US 10,113,631 B2
(45) Date of Patent: Oct. 30, 2018

(54) AXLE ASSEMBLY HAVING RING GEAR WITH UNITARILY AND INTEGRALLY FORMED PORTION OF A BEARING RACE

(71) Applicant: American Axle & Manufacturing, Inc., Detroit, MI (US)

(72) Inventors: Paul J. Valente, Berkley, MI (US); James P. Downs, South Lyon, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 0 days.

(21) Appl. No.: 15/427,348

(22) Filed: Feb. 8, 2017

(65) Prior Publication Data

US 2018/0223978 A1 Aug. 9, 2018

(51) Int. Cl.

| F16H 48/40 | (2012.01) |
|---|---|
| F16H 48/08 | (2006.01) |
| F16H 48/42 | (2012.01) |
| F16H 57/021 | (2012.01) |
| F16H 57/037 | (2012.01) |
| F16H 48/38 | (2012.01) |

(52) U.S. Cl.
CPC ............. *F16H 48/40* (2013.01); *F16H 48/08* (2013.01); *F16H 48/42* (2013.01); *F16H 57/021* (2013.01); *F16H 57/037* (2013.01); *F16H 2048/385* (2013.01); *F16H 2048/405* (2013.01)

(58) Field of Classification Search
CPC ......... F16H 2048/385; F16H 2048/405; F16H 48/40; F16H 57/037
See application file for complete search history.

(56) References Cited

U.S. PATENT DOCUMENTS

| 783,168 A | 2/1905 | Baker |
|---|---|---|
| 899,891 A | 9/1908 | Niclausse |
| 3,385,133 A | 5/1968 | Terao |
| 3,394,610 A | 7/1968 | Szodfridt |
| 3,792,625 A | 2/1974 | Asberg |
| 5,203,750 A | 4/1993 | Oster et al. |
| 5,503,494 A | 4/1996 | Kamata et al. |

(Continued)

FOREIGN PATENT DOCUMENTS

| CN | 201334012 Y | 10/2009 |
|---|---|---|
| EP | 1348589 A2 | 10/2003 |

(Continued)

OTHER PUBLICATIONS

PCT International Search Report dated Jun. 22, 2018 for corresponding PCT application No. PCT/US2018/014374, filed Jan. 19, 2018.

*Primary Examiner* — Erin D Bishop
(74) *Attorney, Agent, or Firm* — Harness, Dickey & Pierce, P.L.C.

(57) ABSTRACT

An axle assembly that includes a housing assembly, an input pinion, a ring gear, a ring gear bearing, and a differential assembly having a differential case. The ring gear bearing supports the ring gear for rotation on the housing assembly as well as handles thrust loads between the ring gear and the housing assembly in opposite axial directions. The ring gear bearing includes an outer bearing race having a first race member, which may be unitarily and integrally formed with the ring gear, and a second race member that is received in a groove formed on the ring gear. The differential case is coupled to the ring gear and secures the second race member to the ring gear.

18 Claims, 2 Drawing Sheets

(56) References Cited

U.S. PATENT DOCUMENTS

Figure 1:
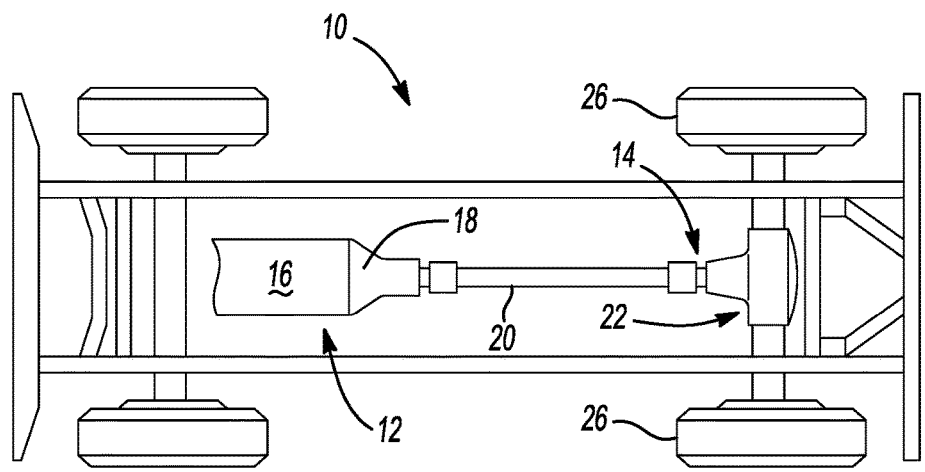

| | | |
|---|---|---|
| 5,913,745 A | 6/1999 | Inagaki et al. |
| 6,544,140 B2 | 4/2003 | Gradu et al. |
| 6,719,661 B2 | 4/2004 | Turner et al. |
| 6,824,489 B2 | 11/2004 | Jacob et al. |
| 6,863,634 B2 | 3/2005 | Holman et al. |
| 7,086,983 B2 | 8/2006 | Turner et al. |
| 7,155,824 B2 | 1/2007 | Prucher |
| 7,188,699 B2 | 3/2007 | Moore et al. |
| 7,314,416 B2 | 1/2008 | Loughrin et al. |
| 7,500,934 B2 | 3/2009 | Ziech |
| 8,616,780 B2 | 12/2013 | Kwasniewski et al. |
| 9,028,358 B2 | 5/2015 | Valente et al. |
| 9,157,515 B2 | 10/2015 | Downs et al. |
| 9,249,872 B2 | 2/2016 | Downs et al. |
| 9,254,713 B2 | 2/2016 | Downs et al. |
| 2003/0070501 A1 | 4/2003 | Bell |
| 2004/0162179 A1 | 8/2004 | Krzesicki et al. |
| 2006/0254382 A1 | 11/2006 | Ebihara |
| 2010/0151983 A1 | 6/2010 | Ziech et al. |
| 2011/0123264 A1 | 5/2011 | Wang |
| 2014/0302961 A1 | 10/2014 | Downs et al. |
| 2014/0342866 A1 | 11/2014 | Valente et al. |

FOREIGN PATENT DOCUMENTS

| | | |
|---|---|---|
| JP | 60084472 | 5/1985 |
| JP | 06117518 | 4/1994 |
| JP | 2001010304 A | 1/2001 |
| JP | 2007-139014 A | 6/2007 |
| WO | WO-2010123964 A1 | 10/2010 |

AXLE ASSEMBLY HAVING RING GEAR WITH UNITARILY AND INTEGRALLY FORMED PORTION OF A BEARING RACE

FIELD

The present disclosure relates to an axle assembly having a ring gear that have a portion of a bearing race formed thereon.

BACKGROUND

This section provides background information related to the present disclosure which is not necessarily prior art.

U.S. Pat. No. 9,157,515 discloses a novel axle assembly for a modern automotive vehicle having an input pinion and a ring gear that are supported by a bearing for rotation as well as thrust loads in two axial directions. Each of these bearings includes a bearing race that is unitarily and integrally formed with an associated one of the input pinon and the ring gear. While configuration in this manner is satisfactory for its intended purpose, we have noted that it would be desirable in some situations to construct the axle assembly somewhat differently.

SUMMARY

This section provides a general summary of the disclosure, and is not a comprehensive disclosure of its full scope or all of its features.

In one form, the present teachings provide an axle assembly that includes a housing assembly, an input pinon mounted to the housing for rotation about a first axis, a ring gear received in the housing and meshingly engaged with the input pinion, a ring gear bearing that supports the ring gear for rotation relative to the housing assembly about a second axis, and a differential assembly. The ring gear bearing has an outer bearing race, an inner bearing race and a plurality of first bearing elements. The outer bearing race includes a first race member and a second race member. The first race member is unitarily and integrally formed with the ring gear. The second race member is received into a circumferentially extending groove formed in the ring gear. The inner bearing race of the ring gear bearing is abutted against a shoulder formed on the housing assembly that is positioned along the second axis at a location that is between the first axis and the first bearing elements. The first bearing elements are engaged to the inner bearing race and to the first and second race members of the outer bearing race. The differential assembly has a differential case and a pair of output members. The differential case is fixedly coupled to the ring gear such that the second race member of the outer bearing race is disposed along the second axis between the differential case and the ring gear. Power transmission between the input pinon and the ring gear that drives the ring gear about the second axis in a first rotary direction generates a first thrust load that is directed along the second axis in a first direction. Power transmission between the input pinion and the ring gear that drives the ring gear about the second axis in a second rotary direction opposite the first rotary direction generates a second thrust load that is directed along the second axis in a second direction that is opposite the first direction. Each of the first and second thrust loads is transmitted through the first bearing elements when the first and second thrust loads are transmitted between the ring gear and the housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
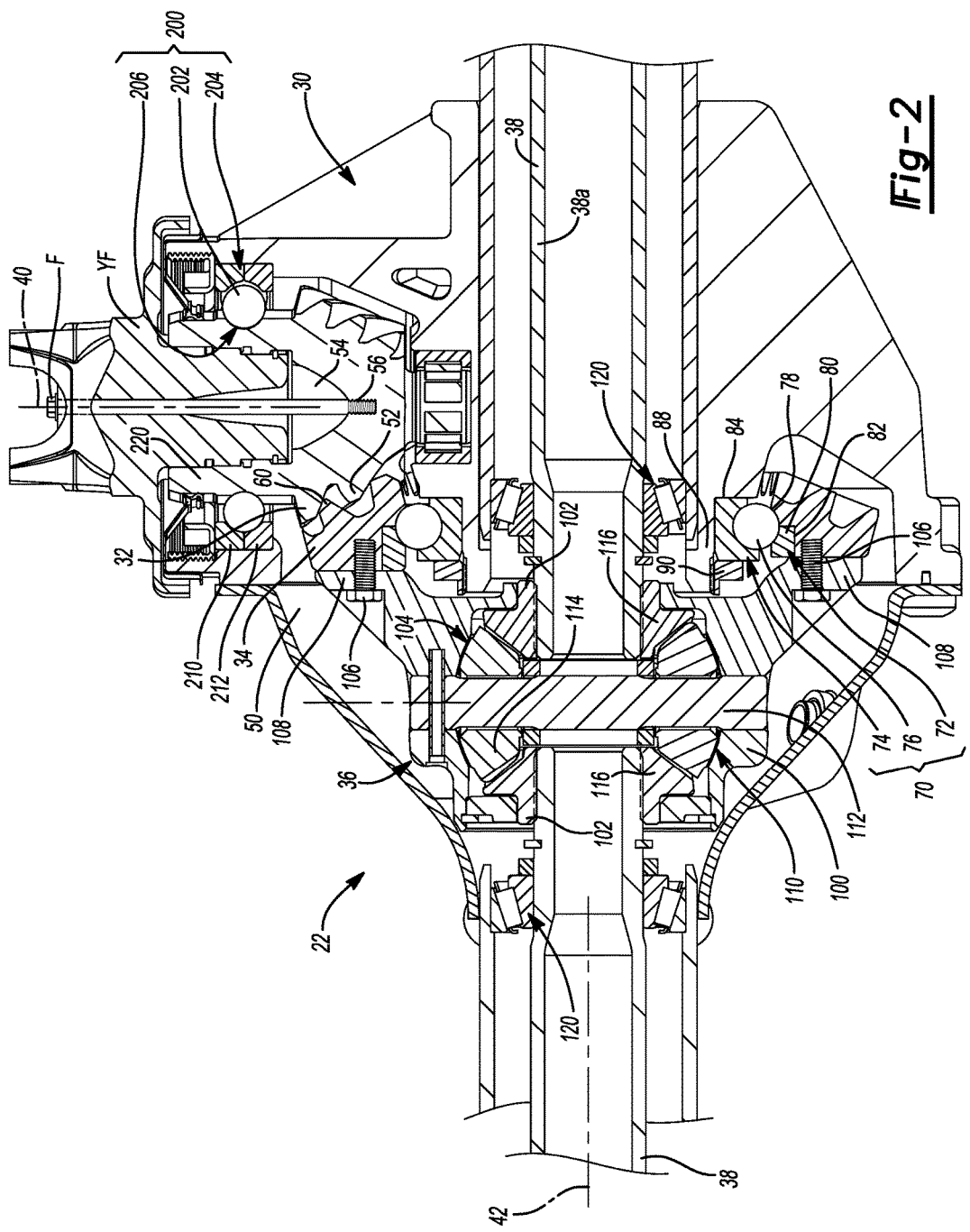

FIG. 1 is a schematic illustration of an exemplary vehicle having an axle assembly constructed in accordance with the teachings of the present disclosure; and FIG. 2 is a longitudinal section view of a portion of the axle assembly of FIG. 1.

Corresponding reference numerals indicate corresponding parts throughout the several views of the drawings.

DETAILED DESCRIPTION

With reference to FIG. 1 of the drawings, an exemplary vehicle having an axle assembly (e.g., a rear axle assembly) constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of a two-wheel, rear-wheel drive configuration, but those of skill in the art will appreciate that the teachings of the present disclosure are applicable to other drive train configurations, including four-wheel drive configurations, all-wheel drive configurations, and front-wheel drive configurations. The drive train 14 can include a prop shaft 20 and a rear axle assembly 22. The propshaft 20 can couple the transmission 18 to the rear axle assembly 22 such that rotary power output of the transmission 18 is received by the rear axle assembly 22. The rear axle assembly 22 can distribute the rotary power to the rear vehicle wheels 26.

With reference to FIG. 2, the rear axle assembly 22 can include a housing assembly 30, an input pinion 32, a ring gear 34, a differential assembly 36, and a pair of axle shafts 38. The input pinion 32 can be rotatable about a first axis 40, while the ring gear 34 and the differential assembly 36 can be rotatable about a second axis 42 that can be transverse or perpendicular to the first axis 40.

The housing assembly 30 can define a differential cavity 50 into which the differential assembly 36 can be received. The input pinion 32 can be received in the differential cavity 50 and can include a plurality of pinion teeth 52. The input pinion 32 can define an internal cavity 54 and a threaded aperture 56 that can intersect the internal cavity 54. A yoke flange YF can be received into the internal cavity 54 and a threaded fastener F can be received through the yoke flange YF and can be threaded into the threaded aperture 56 to secure the yoke flange YF to the input pinion 32.

The ring gear 34 can be received in the differential cavity 50 and can include a plurality of ring gear teeth 60 that are meshingly engaged to the pinion teeth 52. The ring gear 34 can be a bevel gear (e.g., a spiral bevel gear, such as a hypoid gear).

A ring gear bearing 70 can support the ring gear 34 for rotation relative to the housing assembly 30 about the second axis 42. The ring gear bearing 70 can have an outer bearing race 72, an inner bearing race 74 and a plurality of first bearing elements 76. The outer bearing race 72 can include a first race member 78 and a second race member 80. The first race member 78 can be unitarily and integrally formed with the ring gear 34, while the second race member 80 can be received into a circumferentially extending groove 82 formed in the ring gear 34. The inner bearing race 74 of the ring gear bearing 70 can be abutted against a shoulder 84 formed on an annular projection or tube-like protrusion 88 of the housing assembly 30 that is positioned along the second axis 42 at a location that is between the first axis 40 and the first bearing elements 76. The inner bearing race 74 can be secured to the tube-like protrusion 88 in any desired manner, such as via a plurality of threaded fasteners (not shown). In the example provided, the tube-like protrusion 88 is threaded and is threadably engaged to a nut 90 that secures the inner bearing race 74 to the housing assembly 30. The first bearing elements are engaged to the inner bearing race 74 and the first and second race members 78 and 80 of the outer bearing race 72.

The differential assembly 36 can comprise a differential case 100, a pair of output members 102, and a means 104 for permitting speed differentiation between the output members 102. The differential case 100 can be fixedly coupled to the ring gear 34 for rotation therewith and as such, conventional bearings for directly supporting the differential case 100 for rotation on the housing assembly 30 are not needed. Moreover, the differential case 100 can secure the second race member 80 of the ring gear bearing 70 to the ring gear 34. In the example provided, a plurality of threaded fasteners 106 are received through a flange 108 formed on the differential case 100 and are threadably received into threaded holes formed in the ring gear 34. When the threaded fasteners 106 are sufficiently tightened, the second race member 80 is engaged to both the flange 108 and the first bearing elements 76. In this condition, the second race member 80 may be spaced apart from the first race member 78 along the second axis 42 such that the first and second race members 78 and 80 are not in contact with one another. Optionally, a shim (not shown) can be employed between the flange 108 and the second race member 80 to control the preloading of the ring gear bearing 70.

The output members 102 can be rotatably disposed about the second axis 42. The speed differentiation means 104 can comprise any means for permitting speed differentiation between the output members 102. For example, the speed differentiation means 104 can include one or more clutches, such as friction clutches (not shown), that can be operated to permit/control speed differentiation between the output members 102. In the particular example provided, the speed differentiation means 104 comprises a differential gearset 110 having a cross-pin 112, a pair of differential pinions 114 and a pair of side gears 116 that are co-formed with the output members 102. The cross-pin 112 can be mounted to the differential case 100 and can be disposed generally perpendicular to the second axis 42. The differential pinions 114 can be rotatably mounted on the cross-pin 112 and can be meshingly engaged with the side gears 116. Alternatively, the differential gearset 110 could be a planetary configuration that includes an internal gear (not shown), which is non-rotatably coupled to the differential case 100, a planet carrier (not shown), a sun gear (not shown) and a plurality of planet gears (not shown) that are journally supported on the planet carrier and meshingly engaged to the internal gear and the sun gear.

Each of the output members 102 can be fixedly and non-rotatably coupled to an associated one of the side gears 116 (or to an associated one of the sun gear and the planet carrier if the differential gearset 110 employs the planetary configuration discussed above). Each of the output members 102 can comprise an internally splined structure that can be mounted on a corresponding one of the axle shafts 38. One of the axle shafts 38a can extend through the tub-like projection 88 formed on the housing assembly 30. An axle shaft bearing 120 can support the inner end of each axle shaft 38 for rotation on the housing assembly 30. Accordingly, it will be appreciated that the rear axle assembly 22 does not employ any bearings to directly support the differential case 100 for rotation on the housing assembly 30.

During the operation of the axle assembly 22, power transmission between the input pinon 32 and the ring gear 34 that drives the ring gear 34 about the second axis 42 in a first rotary direction generates a first thrust load that is directed along the second axis 42 in a first direction, and power transmission between the input pinion 32 and the ring gear 34 that drives the ring gear 34 about the second axis 42 in a second rotary direction opposite the first rotary direction generates a second thrust load that is directed along the second axis 42 in a second direction that is opposite the first direction. Each of the first and second thrust loads is transmitted through the first bearing elements 76 when the first and second thrust loads are transmitted between the ring gear 34 and the housing assembly 30. More specifically, the first thrust load is transmitted along a path that extends between the inner bearing race 74, the first bearing elements 76 and the first race member 78 (the first thrust load is not transmitted through the second race member 80), while the second thrust load is transmitted along a path that extends between the inner bearing race 74, the first bearing elements 76 and the second race member 80 (the second thrust load is not transmitted through the first race member 78).

A pinion bearing 200 can support the input pinion 32 for rotation relative to the housing assembly 30 about the first axis 40. The pinion bearing 200 can have a plurality of second bearing elements 202 that are disposed circumferentially about the first axis 40. During operation of the axle assembly 22, power transmission between the input pinon 32 and the ring gear 34 that drives the ring gear 34 about the second axis 42 in the first rotary direction generates a third thrust load that is directed along the first axis 40 in a third direction, and power transmission between the input pinion 32 and the ring gear 34 that drives the ring gear 34 about the second axis 42 in the second rotary direction opposite the first rotary direction generates a fourth thrust load that is directed along the first axis 40 in a fourth direction that is opposite the third direction. The third thrust load is transmitted through the second bearing elements 202 when the first thrust load is transmitted between the ring gear 34 and the housing assembly 30, and the fourth thrust load is transmitted through the second bearing elements 202 when the second thrust load is transmitted between the ring gear 34 and the housing assembly 30. In the example provided, the pinion bearing 200 is a four-point angular contact bearing, the second bearing elements 202 are disposed in a single row, and the second bearing elements 202 have a spherical shape.

The pinion bearing 200 can include a first pinion bearing race 204 and a second pinion bearing race 206. The first pinion bearing race 204, which can be an outer bearing race of the pinion bearing 200, can have first and second pinion race members 210 and 212, respectively. The first and second pinion race members 210 and 212 are configured such that the third thrust load is transmitted through the first pinion race member 210 but not the second pinion race member 212 and the fourth thrust load is transmitted through the second pinion race member 212 but not the first pinion race member 210. The second pinion bearing race 206 can be formed into a pinion body or shaft 220 of the input pinion 32. In this regard, the second pinion bearing race 206 is a groove formed (i.e., machined) into the pinion body 220 of the input pinion 32 and as such, is unitarily and integrally formed with the input pinion 32.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle assembly comprising:
a housing assembly;
an input pinion mounted to the housing assembly for rotation about a first axis;
a ring gear received in the housing and meshingly engaged with the input pinion;
a ring gear bearing that supports the ring gear for rotation relative to the housing assembly about a second axis, the ring gear bearing having an outer bearing race, an inner bearing race and a plurality of first bearing elements, the outer bearing race comprising a first race member and a second race member, the first race member being unitarily and integrally formed with the ring gear, the second race member being received into a circumferentially extending groove formed in the ring gear, the inner bearing race of the ring gear bearing being abutted against a shoulder formed on the housing assembly that is positioned along the second axis at a location that is between the first axis and the first bearing elements, the first bearing elements being engaged to the inner bearing race and the first and second race members of the outer bearing race; and
a differential assembly having a differential case and a pair of output members, the differential case being fixedly coupled to the ring gear such that the second race member of the outer bearing race is disposed along the second axis between the differential case and the ring gear;
wherein power transmission between the input pinion and the ring gear that drives the ring gear about the second axis in a first rotary direction generates a first thrust load that is directed along the second axis in a first direction, wherein power transmission between the input pinion and the ring gear that drives the ring gear about the second axis in a second rotary direction opposite the first rotary direction generates a second thrust load that is directed along the second axis in a second direction that is opposite the first direction, and wherein each of the first and second thrust loads is transmitted through the first bearing elements when the first and second thrust loads are transmitted between the ring gear and the housing assembly.

2. The axle assembly of claim 1, wherein a plurality of threaded fasteners secure the ring gear to the differential case.

3. The axle assembly of claim 1, wherein the differential assembly comprises a differential gear set having a pair of side gears and wherein each of the side gears is coupled to an associated one of the output members for common rotation.

4. The axle assembly of claim 3, wherein the differential gear set further comprises a plurality of differential pinions, each of the differential pinions being meshingly engaged with each of the side gears.

5. The axle assembly of claim 4, wherein each of the differential pinions is rotatable about a respective pinion axis, wherein the pinion axes of the differential pinions are disposed in a common plane, and wherein the common plane intersects the second axis at a location that is between the ring gear and the first axis.

6. The axle assembly of claim 1, wherein the first bearing elements have a spherical shape.

7. The axle assembly of claim 1, wherein the first bearing elements are arranged in a single row that extends circumferentially about the second axis.

8. The axle assembly of claim 1, wherein the input pinion has an internal aperture into which a yoke flange is received.

9. The axle assembly of claim 8, wherein a hole is formed into the input pinion, wherein at least a portion of the hole is threaded, and wherein the hole intersects the internal aperture.

10. The axle assembly of claim 9, further comprising a threaded fastener that is threadably coupled to the threaded portion of the hole, the threaded fastener coupling the yoke flange to the input pinion.

11. The axle assembly of claim 1, further comprising a pinion bearing that supports the input pinion for rotation relative to the housing assembly, the pinion bearing having a plurality of second bearing elements that are disposed circumferentially about the first axis, wherein power transmission between the input pinion and the ring gear that drives the ring gear about the second axis in the first rotary direction generates a third thrust load that is directed along the first axis in a third direction, wherein power transmission between the input pinion and the ring gear that drives the ring gear about the second axis in the second rotary direction opposite the first rotary direction generates a fourth thrust load that is directed along the first axis in a fourth direction that is opposite the third direction, wherein the third thrust load is transmitted through the second bearing elements when the first thrust load is transmitted between the ring gear and the housing assembly, and wherein the fourth thrust load is transmitted through the second bearing elements when the second thrust load is transmitted between the ring gear and the housing assembly.

12. The axle assembly of claim 11, wherein the pinion bearing comprises a first pinion bearing race having first and second pinion race members, wherein the third thrust load is transmitted through the first pinion race member but not the second pinion race member and wherein the fourth thrust load is transmitted through the second pinion race member but not the first pinion race member.

13. The axle assembly of claim 11, wherein the first pinion bearing race is an outer bearing race of the pinion bearing.

14. The axle assembly of claim 11, wherein the second bearing elements have a spherical shape.

15. The axle assembly of claim 11, wherein the second bearing elements are arranged in a single row that extends circumferentially about the first axis.

16. The axle assembly of claim 11, wherein the input pinion has a pinion body and wherein the pinion bearing comprises a pinion bearing race that is machined into the pinion body such that the pinion bearing race is integrally and unitarily formed with the input pinion.

17. The axle assembly of claim 1, wherein the housing assembly has an annular hub, wherein the shoulder is formed on the annular hub and wherein one of the axle shafts is received through the annular hub.

18. An axle assembly comprising:

a housing assembly;

an input pinion mounted to the housing assembly for rotation about a first axis;

a ring gear received in the housing and meshingly engaged with the input pinion;

a ring gear bearing that supports the ring gear for rotation relative to the housing assembly about a second axis, the ring gear bearing having an outer bearing race, an inner bearing race and a plurality of first bearing elements, the outer bearing race comprising a first race member and a second race member, the second race member being received into a circumferentially extending groove formed in the ring gear, the inner bearing race of the ring gear bearing being abutted against a shoulder formed on the housing assembly that is positioned along the second axis at a location that is between the first axis and the first bearing elements, the first bearing elements being engaged to the inner bearing race and the first and second race members of the outer bearing race; and a differential assembly having a differential case and a pair of output members, the differential case being fixedly coupled to the ring gear such that the second race member of the outer bearing race is disposed along the second axis between the differential case and the ring gear;

wherein power transmission between the input pinion and the ring gear that drives the ring gear about the second axis in a first rotary direction generates a first thrust load that is directed along the second axis in a first direction, wherein power transmission between the input pinion and the ring gear that drives the ring gear about the second axis in a second rotary direction opposite the first rotary direction generates a second thrust load that is directed along the second axis in a second direction that is opposite the first direction, and wherein each of the first and second thrust loads is transmitted through the first bearing elements when the first and second thrust loads are transmitted between the ring gear and the housing assembly;

wherein the differential case secures the second race member to the ring gear.

* * * * *